United States Patent
Kang et al.

(10) Patent No.: US 7,722,251 B2
(45) Date of Patent: May 25, 2010

(54) DEVICE FOR INSPECTING CONTRABAND IN AVIATION CARGO CONTAINER

(75) Inventors: Kejun Kang, Beijing (CN); Ziran Zhao, Beijing (CN); Hua Peng, Beijing (CN); Zhiqiang Chen, Beijing (CN); Yuanjing Li, Beijing (CN); Yinong Liu, Beijing (CN); Li Zhang, Beijing (CN); Yaohong Liu, Beijing (CN); Zhizhong Liang, Beijing (CN); Dongmao Li, Beijing (CN); Cong Liu, Beijing (CN); Huabin Tan, Beijing (CN); Yongpeng Liu, Beijing (CN); Xinhui Duan, Beijing (CN); Xueyou Zhou, Beijing (CN)

(73) Assignees: Nuctech Company Limited, Beijing (CN); Tsinghua University, Beijing (CN)

( * ) Notice: Subject to any disclaimer, the term of this patent is extended or adjusted under 35 U.S.C. 154(b) by 0 days.

(21) Appl. No.: 12/204,525

(22) Filed: Sep. 4, 2008

(65) Prior Publication Data

US 2009/0060129 A1 Mar. 5, 2009

(30) Foreign Application Priority Data

Sep. 5, 2007 (CN) .......................... 2007 1 0121402

(51) Int. Cl.
*H05G 1/02* (2006.01)
*G01N 23/083* (2006.01)

(52) U.S. Cl. ..................... 378/197; 378/10; 378/19; 378/196

(58) Field of Classification Search .................. 378/10, 378/19, 196, 197

See application file for complete search history.

(56) References Cited

U.S. PATENT DOCUMENTS 3,766,387 A * 10/1973 Heffan et al. ................. 378/58

(Continued)

FOREIGN PATENT DOCUMENTS

CN 101071111 A 11/2007

(Continued)

OTHER PUBLICATIONS

GB Examination Report dated Feb. 5, 2009 issued in corresponding GB Application No. GB0816149.9.

(Continued)

*Primary Examiner*—Edward J Glick
*Assistant Examiner*—Thomas R Artman
(74) *Attorney, Agent, or Firm*—Kenyon & Kenyon LLP

(57) ABSTRACT

A device for inspecting contraband in an aviation cargo container includes: a turntable and a scanning system, the scanning system including a radiation source; a detector; a radiation source mounting structure; and a detector mounting structure for mounting the detector. Each of said radiation source mounting structure and said detector mounting structure includes at least one column assembly. The radiation source and the detector are mounted on the column assembly and allowed to synchronously ascend and descend along said column assembly. By combining different movement modes of the turntable and the scanning system, the device of the present invention can scan the object in various scanning modes. The device is stable in structure, convenient in installation, and occupies a small space. The device can inspect aviation containers over two meters long and/or over two meters wide and achieve a relatively high passing rate of the objects.

22 Claims, 2 Drawing Sheets

U.S. PATENT DOCUMENTS

| | | | |
|---|---|---|---|
| 4,210,815 A * | 7/1980 | Riehl | 378/189 |
| 4,316,091 A * | 2/1982 | Bernardi | 378/17 |
| 4,472,822 A | 9/1984 | Swift | |
| 4,811,372 A * | 3/1989 | Doebert et al. | 378/39 |
| 4,907,157 A * | 3/1990 | Uyama et al. | 382/131 |
| 4,989,225 A * | 1/1991 | Gupta et al. | 378/10 |
| 5,042,487 A * | 8/1991 | Marquardt | 600/425 |
| 5,469,492 A * | 11/1995 | Burbury et al. | 378/197 |
| 5,636,259 A * | 6/1997 | Khutoryansky et al. | 378/197 |
| 5,848,115 A * | 12/1998 | Little et al. | 378/4 |
| 6,052,428 A * | 4/2000 | Nakano et al. | 378/38 |
| 6,148,058 A | 11/2000 | Dobbs | |
| 6,470,068 B2 * | 10/2002 | Cheng | 378/20 |
| 6,735,274 B1 * | 5/2004 | Zahavi et al. | 378/15 |
| 6,851,851 B2 * | 2/2005 | Smith et al. | 378/189 |
| 7,062,011 B1 | 6/2006 | Tybinkowski et al. | |
| 7,434,995 B2 * | 10/2008 | Xu | 378/189 |
| 2008/0084962 A1 | 4/2008 | Zhang et al. | |
| 2008/0165934 A1 | 7/2008 | Hua et al. | |

FOREIGN PATENT DOCUMENTS

| | | |
|---|---|---|
| CN | 101210892 A | 7/2008 |
| DE | 31 50 306 | 6/1983 |
| GB | 2 122 837 | 1/1984 |
| GB | 2420683 | 5/2006 |
| GB | 2 439 413 | 12/2007 |
| RU | 2234451 | 8/2004 |
| SU | 424802 | 4/1974 |
| SU | 863509 | 9/1981 |

OTHER PUBLICATIONS

English Translation of Russian Office Action issued in Russian Application No. 2008135769.

* cited by examiner

DEVICE FOR INSPECTING CONTRABAND IN AVIATION CARGO CONTAINER

CROSS-REFERENCE TO RELATED APPLICATIONS

The present application claims priority to Application No. 200710121402.7, filed in the People's Republic of China on Sep. 5, 2007, which is expressly incorporated herein in its entirety by reference thereto.

FIELD OF THE INVENTION

The present invention relates to cargo security inspection, particularly to a device for inspecting contraband in aviation cargo.

BACKGROUND INFORMATION

Currently, aviation cargo such as an aviation container is still mainly inspected by manual inspection and X-ray tube transmission (only small-sized aviation containers can pass for inspection). Devices using CT (computed tomography) technology are also used for cargo inspection, for example products of Smith Corporation using X-ray tubes and products of Hualixing Company using a radiation source. The above two types of products are greatly limited in use because an X-ray tube exhibits a relatively poor penetration capability and radiation sources are strictly controlled in use and management. In particular, these devices all employ horizontal passing type scanning to conduct CT imaging inspection, i.e., the object passes horizontally, and a scanning system rotates around the travel path of the object such that these CT inspecting systems exhibit a relatively low cargo passing rate. Furthermore, this CT inspecting system is strictly limited by structure and dimensions and penetration ability, so said system cannot be used to inspect aviation containers with relatively large dimensions. For instance, the present-day devices cannot inspect an aviation container two meters long and two meters wide. Furthermore, the above horizontal passing type scanning requires occupation of the same area of ground on the left and right sides of the cargo passageway, so such device occupies a relatively large space.

In addition, in the prior art many kinds of radiation imaging modes such as transmission imaging, multi-viewing imaging, and CT imaging have been advanced. Said different imaging modes generally correspond to different cargo-scanning modes of scanning systems. The above prior art inspective devices can generally only realize one of the scanning modes so that the selection of imaging modes is limited. However, during cargo inspection, sometimes the same cargo needs to be scanned for imaging in different modes. The current inspection devices cannot meet this need.

SUMMARY

An object of the present invention is to overcome at least one of the above drawbacks in the prior art.

To realize the above object, example embodiments of the present invention provide a device for inspecting contraband in an aviation cargo container, including:

a turntable located at an object inspecting position and used to carry the object and bring the object into rotation;

a scanning system which is arranged around the turntable and used to scan the object to acquire imaging data, the scanning system including a radiation source and a detector;

a radiation source mounting structure for mounting the radiation source and a detector mounting structure for mounting the detector, where each of said radiation source mounting structure and said detector mounting structure includes at least one column assembly, and said radiation source and said detector are respectively mounted on the column assembly and allowed to synchronously ascend and descend along said column assembly.

According to example embodiments of the present invention, column assemblies are used to stably mount the radiation source and the detector, and the radiation source and the detector are allowed to synchronously ascend and descend along said column assembly, and the turntable can carry and bring the object into rotation. As such, by virtue of combination of different movement modes of the turntable and the scanning system, the device may scan the object in various scanning modes. Furthermore, according to the present invention, the radiation source and the detector are mounted by column assemblies, so the device is stable in structure, convenient in installation and occupies a small space. The device of the present invention can inspect aviation containers over two meters long and/or over two meters wide. Furthermore, the device can achieve a relatively high passing rate of the objects.

DETAILED DESCRIPTION

Figure 1:
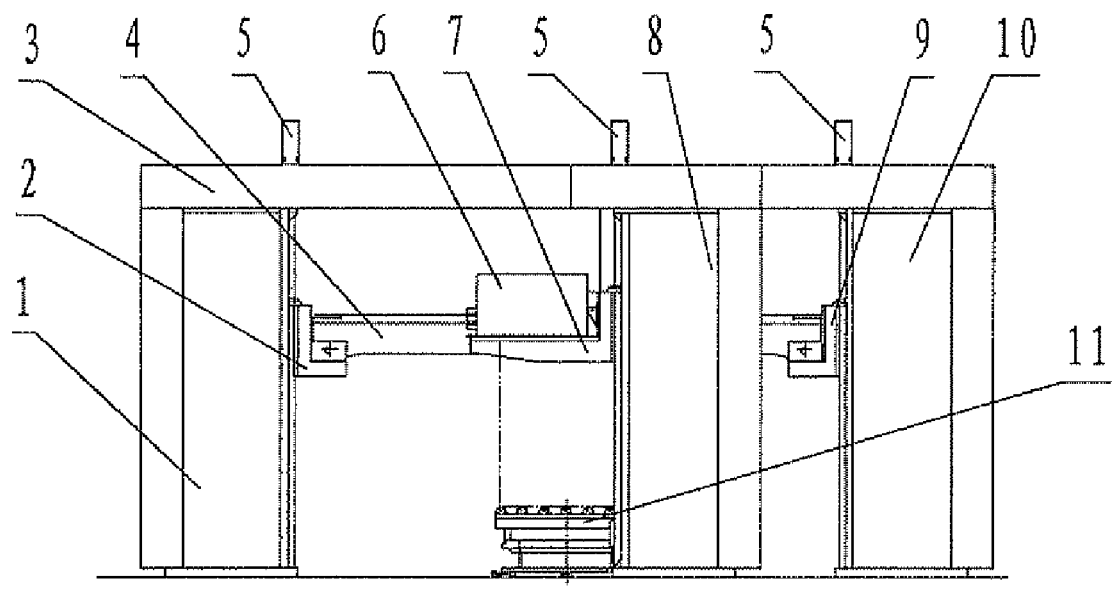
FIG. 1 is a side view of the device according to an embodiment of the present invention.
Figure 2:
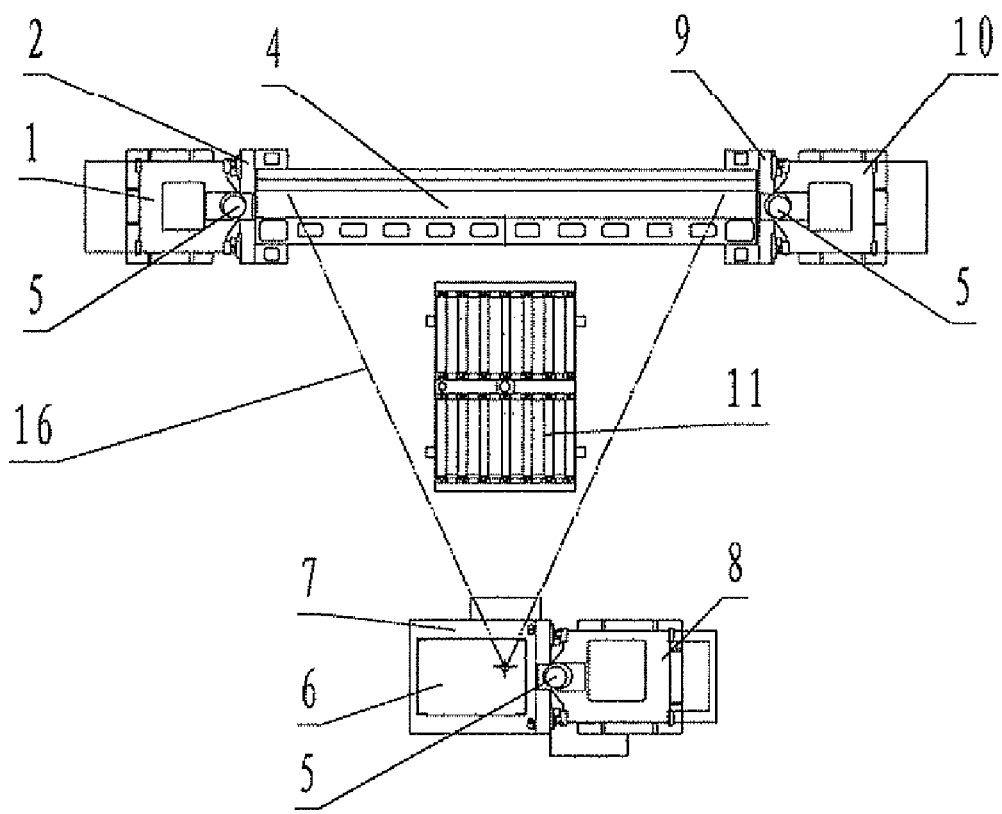
FIG. 2 is a top view of the device according to the embodiment as shown in FIG. 1.
Figure 3:
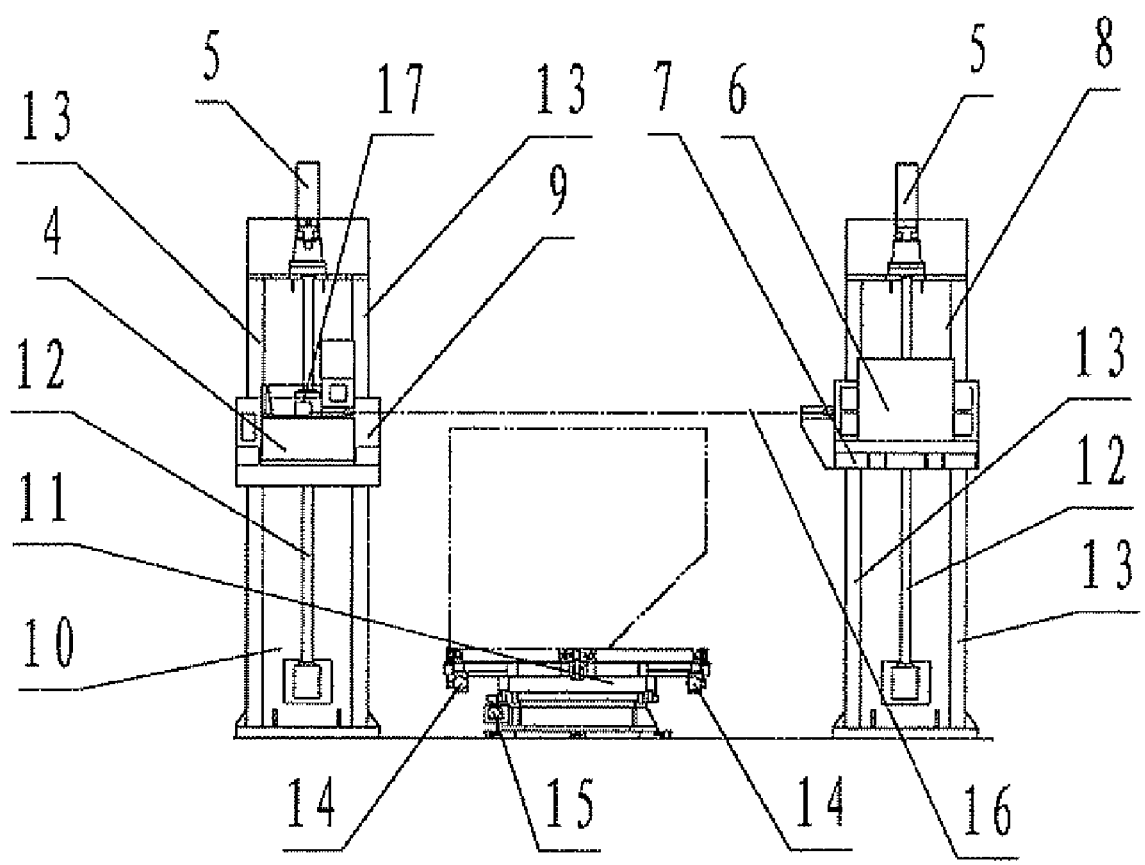
FIG. 3 is a left view of the device according to the embodiment as shown in FIG. 1.

FIGS. 1 to 3 show an example embodiment of the device for inspecting contraband in aviation cargo transport container according to the present invention. As shown in said figures, the device includes a turntable 11 located at an object inspecting position and used to carry the object to be inspected (not shown) such as an aviation container and bring the object into rotation. The device further comprises an object conveying system (not shown) for conveying the object in a horizontal direction to the turntable and for conveying the object away from the turntable upon completion of inspection, which is well known in the art. The object conveying system and the turntable are together called conveyance system. The turntable 11 is situated on a conveyance path of the object conveying system. In an example embodiment, the turntable 11 is a composite rotary conveying worktable. Commonly owned Chinese patent application No. 200610169797.3, which is expressly incorporated herein in its entirety by reference thereto, discloses a composite rotary conveying worktable. The composite rotary worktable can not only convey the object through a scanning passage, but also support and bring the object into rotation in the scanning passage. As such, when the object is to be scanned during rotation, the scanning system (to be described in detail hereunder) is allowed to not rotate about the object, since the object itself rotates.

The device further comprises a turntable drive/control subsystem (not shown) which drives and controls rotation of said turntable so that the turntable can continuously rotate about its rotation axis or rotate to any predetermined angular position. The turntable drive/control subsystem generally includes a motor and a servo controller for said motor.

The device further includes a scanning system which is arranged around the turntable and used to scan the object to acquire imaging data. As shown in the figures, the scanning system includes a radiation source 6 and a detector 17 on both sides of the turntable 11. Said radiation source 6 and said detector 17 can synchronously move in the vertical direction to ensure a horizontal ray surface or plane 16 emitted from said radiation source 6 and the plane where the detector 17 is located are forever in the same horizontal surface or plane. Said radiation source 6 emits controllable X-rays or gamma rays and can be an electronic linear accelerator, isotope source, or an X-ray tube. The detector 17 converts the rays passing through the object into electrical signals and may be, e.g., a solid detector or a gas detector. The detector, in structural form, may employ one or a plurality of linear or arc arrays or high or low energy detector. The scanning system may further include a data collector for converting the electrical signals of the detector into digital signals and transmitting them to a main control computer via a bus or Ethernet. The detector 17 itself may carry the data collector.

The scanning system further comprises a radiation source mounting structure for mounting the radiation source 6 and a detector mounting structure for mounting the detector 17. Said radiation source mounting structure and said detector mounting structure are disposed on both sides of the turntable 11. Said radiation source mounting structure and/or said detector mounting structure includes one or more column assemblies. In an example embodiment, each of said radiation source mounting structure and said detector mounting structure comprises one or more column assemblies. In an example embodiment, each column assembly has substantially the same structure. In FIGS. 1 to 3, the radiation source mounting structure includes a single column assembly, and the detector mounting structure includes two column assemblies to form a scanning frame in a three-column form or structure. Such three-column structure reduces the area of occupation to a maximum extent under the circumstance that stable mounting of the detector and the radiation source is ensured. In addition, to further reduce the area of occupation, the detector disposed at the two column assemblies is preferably a planar detector array. A detector array in a planar form occupies less area than a detector arrays in a form of curved surface.

In FIGS. 1 to 3, the column assemblies include columns 8, 1, or 10 disposed in the vertical direction, wherein the column assembly for the radiation source mounting structure includes the column 8, and the two column assemblies for the detector mounting structure respectively include the column 1 and the column 10. An elevation mechanism is provided on each column in the extension direction of the column and supported by the column, and the radiation source or the detector is mounted on the elevation mechanism. Each elevation mechanism includes a roller leading screw, i.e. leadscrew, 12 and an elevating platform 7, 2, or 9 provided along the column. Of the elevating platforms, as shown in FIGS. 1 to 3, the reference numeral 7 denotes an elevating platform in the column assembly in the radiation source mounting structure and the reference numerals 2 and 9 respectively denote elevating platforms in the two column assemblies in the detector mounting structure. The elevating platform 7, 2, or 9 is mounted on and in threaded connection with the leading screw, i.e., leadscrew, 12, and the radiation source 6 or the detector 17 is correspondingly fixedly mounted on the elevating platform. As such, when the leading screw 12 rotates, the elevating platform 7, 2, or 9 can ascend and descend along the leading screw 12 due to interaction with the threads of the leading screw 12. In an example embodiment, the elevating platform can be in threaded connection with the leading screw via a nut, wherein the nut is in threaded connection with the leading screw and fixedly connected with the elevating platform. In another example platform, the elevating platform itself comprises a threaded passage running therethrough, wherein the threaded passage is in threaded connection with the leading screw. The elevating mechanism may further include at least one guide rail disposed along the column, where the elevating platform may slide along the guide rail so that the guide rail guides the elevating platform to ascend and descend. As shown in the figures, the elevation mechanism includes two guide rails 13 disposed on both sides of the leading screw 12. In an example embodiment, the elevating platform is in sliding connection with the guide rails via a slider, where the slider is in sliding connection with the guide rail and the elevating platform is fixedly connected with the slider. It should be further appreciated that the elevating platform may include a passage running therethrough, the guide rail extending through the passage.

When the detector mounting structure or the radiation source mounting structure includes a plurality of column assemblies, the mounting structure may further include a connection beam connected between each pair of adjacent columns in order to realize structural stability between the column assemblies. As shown in FIGS. 1 to 3, in the detector mounting structure a connection beam 3 is connected between the columns 1 and 10.

When the detector mounting structure includes a plurality of column assemblies, the mounting structure may further include a cross beam connected between each pair of adjacent elevating platforms, wherein the detector (e.g., a planar detector array) is fixedly mounted on the cross beam and fixedly mounted on the elevating platform via the cross beam. As shown in FIGS. 1 to 3, in the detector mounting structure, the cross beam 4 is connected between the elevating platforms 2 and 9, and the detector 17 is connected with the cross beam 4. Due to rigid characteristic of a mechanical structure, in order to reduce requirement for the manufacturing precision, particularly the mounting precision of the rigid structure, both ends of the cross beam 4 are respectively connected with the connection points of the detector elevating platforms 2, 9 with one end being fixedly hinged, and the other end elastically coupled so that the detector cross beam 4 can normally synchronously travel during the scanning operation.

The device according to the present invention further includes a scanning drive/control sub-system which drives and controls the radiation source and the detector into synchronous movement in the vertical direction so that the radiation source and the detector can continuously move in the vertical direction or move to any predetermined vertical position. The scanning drive/control sub-system includes a servo driving motor 5 for driving the leading screw 12 in the column assemblies, and a servo synchronous controller (not shown) for controlling the synchronous operation of the servo drive motor 5. When the device of the present invention is a three-column frame, the servo synchronous controller is a three-axis servo synchronous controller.

Example embodiments of the present invention may further include a main control computer. The controlling portions of the turntable drive/control subsystem and the scanning drive/control sub-system may be performed, in specific implementation, by a single control system which may be, for example, realized by the main control computer and a special software in said main control computer. The main control computer may provide a man-machine interaction interface to control the work of the device according to the operator's instructions and to form and display images according to imaging data. For example, the operator may, via the man-machine interaction interface, input some parameters such as the continuous rotation angle or predetermined angular position of the turntable, continuous movement length or predetermined vertical position of the radiation source or the detector, to the turntable drive/control subsystem and the scanning drive/control subsystem. As such, the operator may control the device to scan the object in various forms. Furthermore, the main control computer may conduct imaging by using the imaging data acquired by the scanning system according to a certain data processing algorithm.

As above discussed, the device according to the present invention may inspect an object in various working modes. Such modes may, for example, include:

(1) transmission planar imaging mode, where the turntable brings the object to at least one predetermined angular position; when the object is at each predetermined angular position, the radiation source and the detector synchronously scan once in the vertical direction to obtain transmission image data at all the predetermined angular positions; the device respectively forms 2-dimensional transmission images when the object is at each predetermined angular position according to the transmission image data at each predetermined angular position.

(2) Multi-viewing 3-D imaging mode, where the turntable brings the object to a plurality of predetermined angular positions; when the object is at each predetermined angular position, the radiation source and the detector synchronously scan once in the vertical direction to obtain transmission image data at all the predetermined angular positions; the device reconstructs a 3-D image of the object according to the transmission image data at the predetermined angular positions. For the algorithm used in the multi-viewing 3-D imaging mode, the commonly owned Chinese patent application No. 200610076574.2, which is expressly incorporated herein in its entirety by reference thereto, for example, may be referred to.

(3) 2-D CT (Computerized Tomography) imaging mode, where the radiation source or the detector is positioned at least one predetermined vertical position; when the radiation source and the detector are positioned at each predetermined vertical position, the turntable brings the object into continuous rotation to acquire CT projection data at the predetermined vertical positions; the device reconstructs a 2-D cross-section image of the object at the predetermined vertical positions according to the CT projection data at the predetermined vertical positions.

(4) helical CT imaging mode, where the radiation source and the detector move from a first predetermined vertical position to a second predetermined vertical position in the vertical direction; meanwhile, the turntable brings the object into continuous rotation so as to spirally scan the object and obtain CT spiral scanning data of the object between the first predetermined vertical position and the second predetermined vertical position, said device reconstructs a 3-D tomography image (volume data) of the object between the first predetermined vertical position and the second predetermined vertical position according to the CT spiral scanning data.

The above modes are only exemplary and it should be appreciated that any other appropriate mode may be provided. It is noted that the turntable can continuously rotate or rotate to any predetermined angular position, while the scanning system (including the radiation source and the detector) can continuously move or move to any predetermined vertical position in the vertical direction. A person skilled in the art can obtain various possible working modes of the device of the present invention by studying different combinations of the movement modes of the turntable and the scanning system of the device of the present invention. The operator may select one or more of the various possible working modes to inspect the object.

The device according to the present invention may conduct quick inspection of large and medium-sized cargo such as standard-sized aviation containers and provide radiation images, such as transmission planar images, CT slice planar images and 3-D images (volume data) (by using multi-viewing imaging method or the spiral CT method), indicative of shape and density distribution of the cargo contained in the aviation container. An inspector can finally quickly judge whether the cargo conforms to that declared and if there is any contraband so as to perform accurate and effective security inspection by analyzing the characteristic information of the object provided by the device.

An exemplary working procedure of the device according to the present invention will be described as follows:

Step (1): convey the object to the turntable 11.

In steps (2)-(4), use the device of the present invention to inspect the object in the transmission planar imaging mode.

Step (2): the turntable 11 is stationary, the radiation source 6 and the detector 17 synchronously scan once in the vertical direction to obtain transmission image data of the object at the current angular position.

Step (3): the turntable 11 rotates 90 degrees and executes the step (2) once again to obtain another transmission image data.

Step (4): display the transmission images from steps (2) and (3) on the screen of the computer, and the operator analyzes the two transmission images and turns to step (8) if a suspected area is found.

In steps (5)-(7), using the device of the present invention to inspect the object in the multi-viewing 3-D imaging mode.

Step (5): the turntable 11 rotates a relatively small angle, e.g., an angle from 10 degrees to 30 degrees, and step (2) is executed once more.

Step (6): repeatedly execute step (5) ten times.

Step (7): reconstruct a 3-D image of the object using the above obtained 12 transmission image data via data processing; turning to step (8) if a suspected area is found; otherwise the object passes the inspection.

In step (8), use the device of the present invention to scan the suspected area in 2-D CT imaging mode or helical CT imaging mode. Specifically, the radiation source 6 and the detector 17 are positioned at the level of the suspected area, and the turntable 11 brings the object into continuous rotation. In the 2-D CT imaging mode, the radiation source 6 and the detector 17 remain stationary, acquire CT projection data at the current position, and reconstruct a 2-D cross-section image by means of data processing. In the helical CT imaging mode, the radiation source 6 and the detector 17 scan in the vertical direction within the scope of the suspected area so as to acquire the CT projection data of the suspected area and reconstruct a 3-D tomography image (volume data) by means of data processing.

Step (9): the operator makes a final judgment through the tomography image.

What is claimed is:

1. A device for inspecting contraband in an aviation cargo container, comprising:

a turntable located at an object inspecting position and arranged to carry an object to be inspected and bring the object into rotation;

a scanning system which is arranged around the turntable and used to scan the object to acquire imaging data, the scanning system including a radiation source and a detector;

a radiation source mounting structure to mount the radiation source, the radiation source mounting structure including at least one column assembly on which the radiation source mounting structure is mounted and along which the radiation source mounting structure is allowed to ascend and descend; and a detector mounting structure to mount the detector;

wherein:

the detector mounting structure includes:

a plurality of column assemblies along which the detector mounting structure is allowed to ascend and descend synchronously with respect to the radiation source mounting structure, each of said plurality of column assemblies including an elevation mechanism that has an elevating platform; and a cross beam connected between at least one pair of adjacent elevating platforms of the plurality of elevating platforms of the plurality of column assemblies, the detector being fixedly mounted on the cross beam and fixedly mounted on the at least one pair of elevating platforms via the cross beam; and one end of said cross beam is fixedly hinged to one of said adjacent elevating platforms, and the other end of the said cross beam is elastically coupled to the other of said adjacent elevating platforms.

2. The device according to claim 1, wherein said turntable is a composite rotary conveying worktable.

3. The device according to claim 1, wherein:

each of said at least one column assembly of the radiation source mounting structure comprises:

a column disposed in a vertical direction; and an elevation mechanism (a) disposed along said column, (b) supported by said column, and (c) on which said radiation source is mounted;

each of said plurality of column assemblies of the detector mounting structure comprises a column disposed in the vertical direction; and each of the elevation mechanisms of said plurality of column assemblies of said detector mounting structure (a) is disposed along and supported by the column of the respective column assembly of the respective elevation mechanism, and (b) has mounted thereon said detector.

4. The device according to claim 3, wherein:

the elevation mechanism of each of said at least one column assembly of said radiation source mounting structure comprises an elevating platform on which said radiation source is mounted;

each of said elevation mechanisms of said radiation source mounting structure and of said detector mounting structure comprises a leading screw disposed along the respective column of the respective elevation mechanism, the respective elevating platform of the respective elevation mechanism being mounted on and being in threaded connection with the respective leading screw of the respective elevation mechanism;

the detector is fixedly mounted on each of the elevating platforms of the detector mounting structure; and for each of leading screws of said radiation mounting structure and of said detector mounting structure, when the respective leading screw rotates, the elevating platform of the respective elevation mechanism of the respective leading screw is capable of ascending and descending along the respective leading screw due to interaction with threads of the respective leading screw.

5. The device according to claim 4, wherein, for each of the elevation mechanisms, the respective elevating platform is in threaded connection with the respective leading screw via a respective nut, the respective nut being in threaded connection with the respective leading screw and fixedly connected with the respective elevating platform.

6. The device according to claim 4, wherein, for each of the elevation mechanisms, the respective elevating platform comprises a threaded passage running therethrough, the threaded passage being in threaded connection with the respective leading screw.

7. The device according to claim 3, wherein, for each of said at least one column assembly of the radiation source mounting structure and each of said plurality of column assemblies of the detector mounting structure, the respective elevation mechanism of the column assembly further comprises at least one guide rail disposed along the respective column of the column assembly, the respective elevating platform of the column assembly being arranged to slide along the respective guide rail so that the respective guide rail guides the respective elevating platform to ascend and descend.

8. The device according to claim 7, wherein, for each of the elevation mechanisms, the respective elevating platform of the elevation mechanism is in sliding connection with the respective guide rail of the elevation mechanism via a slider, the slider being in sliding connection with the respective guide rail and fixedly connected with the respective elevating platform.

9. The device according to claim 7, wherein, for each of the elevation mechanisms, the respective elevating platform comprises a passage running therethrough to receive the respective guide rail of the elevation mechanism.

10. The device according to claim 3, wherein the device further comprises a scanning drive/control sub-system which drives and controls the radiation source and the detector into synchronous movement in the vertical direction so that the radiation source and the detector can continuously move in the vertical direction or move to a predetermined vertical position.

11. The device according to claim 10, wherein:

the elevation mechanism of each of said at least one column assembly of said radiation source mounting structure comprises an elevating platform on which said radiation source is mounted;

each of said elevation mechanisms of said radiation source mounting structure and of said detector mounting structure comprises a leading screw disposed along the respective column of the respective elevation mechanism, the respective elevating platform of the respective elevation mechanism being mounted on and being in threaded connection with the respective leading screw of the respective elevation mechanism;

the scanning drive/control sub-system comprises:

a servo driving motor for driving the leading screw in each of the column assemblies; and a servo synchronous controller for controlling a synchronous operation of the servo driving motor.

12. The device according to claim 10, wherein the device inspects the object in at least one of a plurality of working modes.

13. The device according to claim 12, wherein the plurality of working modes include the following:

a transmission planar imaging mode, in which the turntable brings the object to at least one predetermined angular position, the radiation source and the detector synchronously scanning once in the vertical direction for, and when the object is at, each of the at least one predetermined angular position to obtain, for each of the at least one predetermined angular position, respective transmission image data according to which the device forms respective 2-dimensional transmission images for each of the at least one predetermined angular position;

a multi-viewing 3-D imaging mode, in which the turntable brings the object to a plurality of predetermined angular positions, the radiation source and the detector synchronously scanning once in the vertical direction for, and when the object is at, each of the plurality of predetermined angular positions to obtain, for each of the plurality of predetermined angular positions, transmission image data according to which the device constructs a 3-D image of the object;

a 2-D CT imaging mode, in which, for each of at least one predetermined vertical position:
the radiation source and the detector are positioned at the predetermined vertical position; and
when the radiation source and detector are positioned at the predetermined vertical position, the turntable brings the object into continuous rotation to acquire respective CT projection data according to which the device reconstructs a respective 2-D cross-section image of the object; and a helical CT imaging mode, in which the radiation source and the detector move from a first predetermined vertical position to a second predetermined vertical position in the vertical direction while the turntable brings the object into continuous rotation so as to spirally scan the object and obtain CT spiral scanning data of the object between the first predetermined vertical position and the second predetermined vertical position, and in which said device reconstructs a 3-D tomography image of the object according to the CT spiral scanning data.

14. The device according to claim 13, wherein the plurality of working modes include the helical CT imaging mode, and the 3-D tomography image includes volume data.

15. The device according to claim 10, wherein:
the scanning drive/control sub-system comprises a servo driving motor for driving a leading screw in each of the column assemblies; and
a servo synchronous controller for controlling a synchronous operation of the servo driving motor.

16. The device according to claim 1, wherein said at least one column assembly of said radiation source mounting structure consists of a single column assembly.

17. The device according to claim 1, wherein:
each of the plurality of column assemblies of the detector mounting structure comprises a column disposed in a vertical direction; and
said detector mounting structure further comprises a connection beam connected between at least one pair of adjacent columns of the plurality of columns of the plurality of column assemblies.

18. The device according to claim 1, wherein said plurality of column assemblies consists of said detector mounting structure consists of two column assemblies.

19. The device according to claim 1, wherein the device further comprises an object conveying system for conveying the object in a horizontal direction to the turntable and for conveying the object away from the turntable upon completion of inspection.

20. The device according to claim 1, wherein the device further comprises a turntable drive/control subsystem which drives and controls rotation of said turntable so that the turntable is capable of at least one of: (a) continuously rotating about its rotation axis and (b) rotating to a predetermined angular position.

21. The device according to claim 1, wherein the device further comprises a main control computer providing a man-machine interaction interface to control work of the device according to an operator's instructions and to form and display images according to imaging data.

22. The device according to claim 1, wherein said detector is a detector array in a planar form.

* * * * *